United States Patent Office 3,341,540
Patented Sept. 12, 1967

3,341,540
3-AMINO-6-HALOPYRAZINONITRILES AND THEIR SYNTHESES
Edward J. Cragoe, Jr., Lansdale, and James H. Jones, Blue Bell, Pa., assignors to Merck & Co., Inc., Rahway, N.J., a corporation of New Jersey
No Drawing. Filed Oct. 4, 1965, Ser. No. 492,862
12 Claims. (Cl. 260—250)

This invention embraces a method for preparing 3-amino-5-X-6-halopyrazinonitriles where X is a hydrogen or a substituent group advantageously of the type described below as well as the novel products thus produced.

The products produced by the novel process of this invention are important intermediates in the synthesis of 2,4-diaminopteridine compounds having a halogen atom attached to the 6-positon of the pteridine nucleus; products that could not be made by methods known in the literature prior to applicants' discovery. The 3-amino-6-halopyrazinonitriles are particularly valuable as intermediates in the synthesis of 2,4-diamino-6-halo-7-(unsubstituted or substituted)-pteridine compounds especially where the 7-position substituent is an amino or other substiuent group which products are nowhere disclosed in the prior literature and which cannot be synthesized by any method heretofore described. The 2,4-diamino-6-halopteridine compounds that are either unsubstituted or substituted, but particularly amino-substituted on the 7-position carbon that can be prepared from the novel products of this invention possess diuretic and saluretic properties and are useful in the treatment of edema or other conditions associated with an abnormal retention of fluids and/or electrolytes especially sodium and chloride ions. As the products are effective upon oral and parenteral administration, they can be administered in any of the usual suitable dosage forms such as admixed with lactose, encapsulated and administered orally. While the dosage of the selected pteridine will vary depending upon the age and condition of the patient and the particular product used, effective dosages ranging between about 50–500 mg. per dose administered one to four times daily generally will produce the desired effect.

It hase been found that the 3-amino-5-X-6-halopyrazinonitriles (I) of this invention can be prepared by the reactions illustrated graphically below:

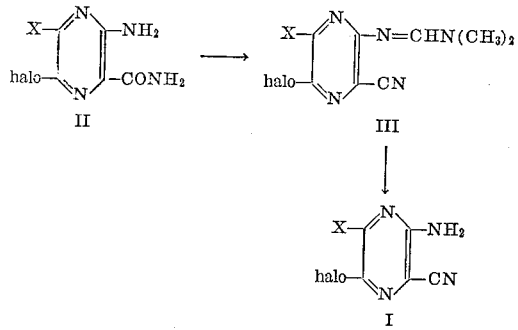

The 3-amino-5-X-6-halopyrazinamide (II) upon treatment with either phosphoryl chloride or thionyl chloride in the presence of dimethylformamide, advantageously by warming forms the corresponding N,N-dimethyl-N′-(3-cyano-5-halo-6-X-2-pyrazinyl)formamidine (III), which can be hydrolyzed in the presence of a strong mineral or organic acid (such as hydrochloric, sulfuric, methanesulfonic and the like acids) to produce the desired 3-amino-5-X-6-halopyrazinonitrile (I).

It is to be recognized that if X is amino in the starting amide (II), in the intermediate (III) X will be

but in the product (I) will be amino since hydrolysis will involve both the 3- and the 5-substituents.

The novel 3-amino-5-X-6-halopyrazinonitriles made by the process of this invention are those in which the 6-halo substiuent is chloro or bromo and wherein X is selected from the group consisting of (1) hydrogen, (2) chloro, (3) bromo, (4) lower-alkyl, (5) mononuclear aryl lower-alkyl, (6) lower alkoxy, (7) mononuclear aryl lower-alkoxy, (8) lower alkylthio, (9) mononuclear aryl lower alkylthio, (10) mononuclear aryl (especially phenyl, alkyl-substituted phenyl or halo-substituted phenyl), or (11) amino having the structure $R^1R^2N-$ wherein $R^1$ and $R^2$ are the same or different and each is selected from the group consisting of (a) hydrogen, (b) lower alkoxy, (c) mononuclear aryl (especially phenyl, alkyl substituted phenyl or halo substituted phenyl), (d) lower alkyl, (e) lower alicyclic, (f) substituted lower alkyl (wherein the substituent groups are halo, alkoxy, alicyclic, mononuclear aryl, especially phenyl, lower alkyl substituted aryl, halo-substituted aryl, di-lower alkylamino, heterocyclic, especially mononuclear heterocyclic such as furyl, pyridyl and the like) or (g) $R^1R^2N-$ can have the structure

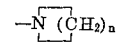

wherein n is 4, 5 or 6.

An alternate route to the 3-amino-5-$R^3R^4$N-6-halopyrazinonitriles (IB) involves the reaction of one of the compounds of this invention, namely a 3-amino-5-chloro (or bromo)-6-halopyrazinonitrile (IA), with ammonia, a primary amine or a secondary amine. The reaction is advantageously conducted

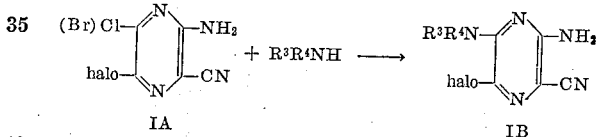

in a polar solvent, such as dimethylformamide, dimethyl sulfoxide, sulfolane and the like. The reaction can be carried out at ambient temperature; however, it is advantageous to conduct the reaction at higher temperatures such as 50° C. to 120° C. for a period of from 10 minutes to 6 hours.

This method has the advantage that the $R^3R^4$ substituents cannot only be the same as the $R^1$ and $R^2$ groups described supra but also can be hydroxyalkyl, polyhydroxyalkyl and amino.

The 3-amino-5-$X^1$-6-halopyrazinamide (IIA) intermediates (where $X^1$ represents each of the X groups described supra except lower alkoxy and lower alkylmercapto) advantageously are prepared by the reaction of the appropriate alkyl 3-amino5-$X^1$-6-halopyrazinate (VI) with ammonia.

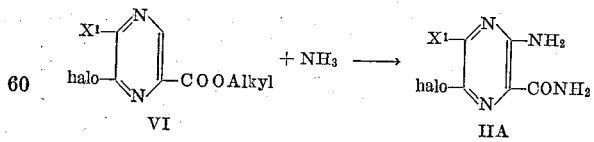

The reaction can be conducted using liquid ammonia at temperatures slightly below ambient temperature to slightly above ambient temperature. Alternatively, the ester can be dissolved in an inert solvent and ammonia gas admitted below the surface of the solution. With esters which have a 5-chloro or bromo substiuent, lower temperatures and the use of liquid ammonia and a nonpolar solvent favor the formation of the desired amide (IIA) while higher temperatures and polar solvents favor the formation of 3,5-diamino-6-halopyrazinamide.

The 3-amino-5-$X^2$-6-halopyrazinamide (IIB) intermediates (where $X^2$ represents lower alkoxy, lower alkylthio and $R^1R^2N$—) can be prepared by the reaction of a 3-amino-5-chloro(or bromo)-6-halopyrazinamide (IIC) with an appropriate reagent (VII):

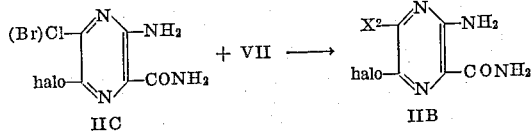

When the reagent (VII) is a lower alkanol (ROH) or lower alkyl mercaptan (RSH) and a base, such as triethylamine or pyridine in a solvent as dimethylformamide or dimethyl sulfoxide is used, the product is a 3-amino-5-lower alkoxy(or lower alkylthio)-6-halopyrazinamide. The reaction also can be carried out using ROM or RSM where M is derived from an alkali metal. When ROM is used ROH can be used as a solvent. When VII is $R^1R^2NH$ in a solvent such as dimethyl sulfoxide or dimethylformamide the product is a 3-amino-5-$R^1R^2N$-6-halopyrazinamide. It is usually advantageous to conduct these reactions above ambient temperature, such as at 50° C. to the reflux temperature of the solvent.

The 3-amino-5-X-6-chloro(or bromo)pyrazinonitriles react with guanidine to produce physiologically active 2,4-diamino-6-chloro(bromo)-7-X-pteridines. It is advantageous to employ a solvent such as a lower alkanol. When X represents chloro or bromo, it is necessary to employ an inert solvent such as tert.-butyl alcohol since many other alkanols will react replacing the chloro(or bromo) with alkoxy.

The novel methods as well as the novel products of this invention will be described in greater detail in the following examples which are illustrative but not limitative of the invention.

EXAMPLE 1

*3-amino-6-chloropyrazinonitrile*

STEP A.—PREPARATION OF 3-AMINO-6-CHLOROPYRAZINAMIDE

Methyl 3-amino-6-chloropyrazinoate (25 g., 0.133 mole) is suspended in concentrated ammonium hydroxide (500 ml.) and then stirred and heated on a steam bath for an hour. The reaction mixture is cooled and the product removed by filtration, washed with water and dried. The yield of 3-amino-6-chloropyrazinamide is 20 g. (88%), M.P. 222–225° C. Recrystallization from a mixture of alcohol and water gives material melting at 231–232° C.

*Analysis.*—Calculated for $C_5H_5ClN_4O$: C, 34.80; H, 2.92; N, 32.47. Found: C, 35.28; H, 3.38; N, 32.55.

STEP B.—PREPARATION OF N,N-DIMETHYL-N'-(3-CYANO-5-CHLORO-2-PYRAZINYL)FORMAMIDINE

A suspension of 3-amino-6-chloropyrazinamide (17.2 g., 0.1 mole) in dimethylformamide (170 ml.) is treated with phosphoryl chloride (17 ml.). The temperature of the reaction mixture rises spontaneously to about 80° C., after which it is stirred with heating for 10 minutes on a steam bath. After cooling, the mixture is poured into ice-water (1 liter), and then neutralized with ammonium hydroxide. The yield of N,N-dimethyl-N'-(3-cyano-5-chloro-2-pyrazinyl)formamidine is 14.2 g. (69%), M.P. 110–114° C. Recrystallization from cyclohexane gives material melting at 114–116° C.

*Analysis.*—Calculated for $C_8H_8ClN_5$: C, 45.83; H, 3.84; N, 33.41. Found: C, 45.84; H, 3.65; N, 33.49.

STEP C.—PREPARATION OF 3-AMINO-6-CHLOROPYRAZINONITRILE

A solution of N,N-dimethyl-N'-(3-cyano-5-chloro-2-pyrazinyl)formamidine (4 g., 0.02 mole) in 5% aqueous hydrochloric acid (100 ml.) is heated on a steam bath for 10 minutes. A yellow solid separates during the heating. The reaction mixture is cooled and the 3-amino-6-chloropyrazinonitrile is separated by filtration, washed with water and dried. The yield is 2.8 g. (95%), M.P. 151–153° C. Recrystallization from cyclohexane gives pure 3-amino-6-chloropyrazinonitrile, M.P. 151–153° C.

*Analysis.*—Calculated for $C_5H_3ClN_4$: C, 38.86; H, 1.96; N, 36.25. Found, C, 39.33; H, 2.24; N, 36.43.

EXAMPLE 2

*3-amino-6-bromopyrazinonitrile*

3-aminopyrazinonitrile (11.1 g., 0.093 mole) is dissolved in acetic acid (92 ml.) by warming to 60° C. and a solution of bromine (16 g., 0.2 g. atom) in acetic acid (7 ml.) is added. The mixture is stirred for 15 minutes and then cooled and poured into ice water (300 ml.). The solid that separates is removed by filtration, washed with water and dried yielding 15.7 g. (85%) of product, M.P. 170–174° C. After recrystallization from benzene and then ethanol, the 3-amino-6-bromopyrazinonitrile melts at 181–183° C.

*Analysis.*—Calculated for $C_5H_3BrN_4$: C, 30.18; H, 1.52; N, 28.15. Found: C, 30.44; H, 1.69; N, 28.40.

EXAMPLE 3

*3-amino-5,6-dichloropyrazinonitrile*

STEP A.—PREPARATION OF 3-AMINO-5,6-DICHLOROPYRAZINAMIDE

A stainless steel autoclave is charged with methyl 3-amino-5,6-dichloropyrazinoate (11.1 g., 0.05 mole) and liquid ammonia (100 ml.) and is kept at 25° C. for 24 hours. The ammonia is expelled, and the product rinsed from the autoclave with methanol (200 ml.). The methanol insoluble fraction (4.0 g.) is recrystallized from dimethylformamide (40 ml.) to give the pure 3-amino-5,6-dichloropyrazinamide, M.P. 291.5–293.5° C.

*Analysis.*—Calculated for $C_5H_4Cl_2N_4O$: C, 29.07; H, 1.95; N, 27.06. Found: C, 29.58; H, 1.87; N, 27.36.

STEP B.—PREPARATION OF N,N-DIMETHYL-N'-(3-CYANO-5,6-DICHLORO-2-PYRAZINYL)FORMAMIDINE

A suspension of 3-amino-5,6-dichloropyrazinamide (22 g., 0.106 mole) in dimethylformamide (220 ml.) is stirred and treated with phosphoryl chloride (22 ml.). The temperature spontaneously rises to 65° C. after which it is heated to 80° C. and then stirred with heating for 10 minutes. The solution is cooled and poured into water (500 ml.) to give 12.5 g. (48%) of N,N-dimethyl-N'-(3-cyano-5,6-dichloro-2-pyrazinyl)-formamidine, M.P. 116–118° C. After recrystallization from methylcyclohexane the product melts at 117–119° C.

*Analysis.*—Calculated for $C_8H_7Cl_2N_5$: C, 39.35; H, 2.89; N, 28.70. Found: C, 38.76; H, 3.05; N, 28.94.

STEP C.—PREPARATION OF 3-AMINO-5,6-DICHLOROPYRAZINONITRILE

A solution of N,N-dimethyl-N'-(3-cyano-5,6-dichloro-2-pyrazinyl)formamidine (2.5 g., 0.01 mole) in a solution of water (100 ml.) and 6 N hydrochloric acid (10 ml.) is stirred and heated on a steam bath for an hour. The mixture is cooled and the pale yellow solid recovered by filtration yielding 1.85 g. (95%) of product, melting point 213–215° C. After recrystallization from benzene the 3-amino-5,6-dichloropyrazinonitrile still melts at 213–215° C.

*Analysis.*—Calculated for $C_5H_2Cl_2N_4$: C, 31.74; H, 1.06; N, 29.64. Found: C, 31.83; H, 1.34; N, 29.41.

EXAMPLE 4

*3-amino-5-methoxylamino-6-chloropyrazinonitrile*

3-amino-5,6-dichloropyrazinonitrile from Example 3 (0.0625 mole) is dissolved in dimethyl sulfoxide (50 ml.) at 65° C., then methoxylamine (0.05 mole) is added and the solution stirred at this temperature for 15 minutes. After cooling, the reaction mixture is poured into water (150 ml.) and the solid that separates is removed by filtration, washed with water and dried yielding 3-amino-5-methoxylamino-6-chloropyrazinonitrile.

EXAMPLE 5

3-amino-5-chloro-6-bromopyrazinonitrile

STEP A.—PREPARATION OF METHYL 3-AMINO-6-BROMOPYRAZINOATE 4-OXIDE

A solution of methyl 3-amino-6-bromopyrazinoate (4.6 g., 0.02 mole) and m-chloroperbenzoic acid (3.4 g., 0.02 mole) in chloroform (75 ml.) is refluxed for one hour, then chilled. The solid that separates is recovered by filtration and recrystallized from ethanol to yield 5.0 g. (98%) of methyl 3-amino-6-bromopyrazinoate 4-oxide, M.P. 200–202° C.

STEP B.—PREPARATION OF METHYL 3-AMINO-5-CHLORO-6-BROMOPYRAZINOATE

Methyl 3-amino-6-bromopyrazinoate 4-oxide (2.0 g., 0.008 mole) is dissolved in dimethylformamide (20 ml.), phosphoryl chloride (2.0 ml.) is added and the reaction is stirred vigorously for 30 minutes and then poured into water (100 ml.). The clear solution deposits reddish crystals after standing for several hours, which are recrystallized from acetonitrile to yield 1.5 g. (71%) of methyl 3-amino-5-chloro-6-bromopyrazinoate, M.P. 225–228° C.

STEP C.—PREPARATION OF 3-AMINO-5-CHLORO-6-BROMOPYRAZINONITRILE

By replacing the methyl 3-amino-5,6-dichloropyrazinoate employed in Step A of Example 3 by an equimolecular quantity of methyl 3-amino-5-chloro-6-bromopyrazinotate and then following the same procedures and using equivalent quantities of reactants described in Steps A through C of Example 3, there is produced successively 3-amino-5-chloro-6-bromopyrazinamide, N,N-dimethyl-N'-(3-cyano-5-bromo-6-chloro-2-pyrazinyl)formamidine and 3-amino-5-chloro-6-bromopyrazinonitrile.

EXAMPLE 6

3-amino-5,6-dibromopyrazinonitrile

STEP A.—PREPARATION OF METHYL 3-AMINO-5,6-DIBROMOPYRAZINOATE

By replacing the phosphoryl chloride used in Step B of Example 5 by an equal quantity of phosphoryl bromide and following substantially the same procedure described in Example 5, Step B, there is obtained methyl 3-amino-5,6-dibromopyrazinoate.

STEP B.—PREPARATION OF 3-AMINO-5,6-DIBROMOPYRAZINONITRILE

By replacing the methyl 3-amino-5,6-dichloropyrazinoate employed in Example 3, Step A, by an equimolecular quantity of methyl 3-amino-5,6-dibromopyrazinoate and then using the same procedures and using equivalent quantities of the appropriate reagents and reactants described in Example 3, Steps A through C, there is produced successively 3-amino-5,6-dibromopyrazinamide, N,N-dimethyl-N'-(3-cyano-5,6-dibromo-2-pyrazinyl)formamidine and 3-amino-5,6-dibromopyrazinonitrile.

EXAMPLE 7

3,5-diamino-6-chloropyrazinonitrile

STEP A.—PREPARATION OF 3,5-DIAMINO-6-CHLOROPYRAZINAMIDE

Methyl 3-amino-5,6-dichloropyrazinoate (22.2 g., 0.1 mole) is added to liquid ammonia (200 ml.) in a stainless steel autoclave and the reaction mixture is heated at 100° C. for 12 hours. The ammonia is expelled and the product is removed from the autoclave and recrystallized from methanol to five 16.8 g. (90%) of 3,5-diamino-6-chloropyrazinamide, M.P. 218.5–220.5° C.

Analysis.—Calculated for $C_5H_6ClH_5O$: C, 32.01; H, 3.22; N, 37.33; Cl, 18.90; Found: C, 32.36; H, 3.00; N, 37.50; Cl, 18.84.

STEP B.—PREPARATION OF 3,5-DIAMINO-6-CHLOROPYRAZINONITRILE

To a stirred suspension of 3,5-diamino-6-chloropyrazinamide (2.0 g., 0.0115 moles) in dimethylformamide (20 ml.) is added phosphoryl chloride (2.0 ml. excess) in one portion. The reaction temperature rises to 80° C. and is maintained at this temperature for 10 minutes by application of external heat. The solvent then is removed in vacuo and the residue is added to boiling water (50 ml.). In a few minutes a yellow crystalline solid separates, the solution is cooled, and the product recovered by filtration to yield 1.5 g. (77%) M.P. 290–295° C. After recrystallization from water, 3,5-diamino-6-chloropyrazinonitrile melts at 295° C.

Analysis.—Calculated for $C_5H_4N_5Cl$: C, 35.41; H, 2.48; N, 41.30. Found: C, 35.69; H, 2.30; N, 41.10.

EXAMPLE 8

3-amino-5-isopropylamino-6-chloropyrazinonitrile

STEP A.—PREPARATION OF 3-AMINO-5-ISOPROPYLAMINO-6-CHLOROPYRAZINAMIDE

To a solution of 3-amino-5,6-dichloropyrazinamide (12.4 g., 0.006 mole) in dimethyl sulfoxide (160 ml.) is added isopropylamine (7.10 g., 0.12 mole) and the reaction is heated at 65° C. for 30 minutes. The reaction is then poured into water (300 ml.) and the precipitated product recovered by filtration and dried to yield 8.2 g. (60%), M.P. 137–139° C. After recrystallization from isopropyl alcohol, 3-amino-5-isopropylamino-6-chloropyrazinamide melts at 140–141° C.

Analysis.—Calculated for $C_8H_{12}N_5OCl$: C, 41.85; H, 5.26; N, 30.50. Found: C, 41.55; H, 5.25; N, 30.56.

STEP B.—PREPARATION OF N,N-DIMETHYL-N'-(3-CYANO-5-CHLORO-6-ISOPROPYLAMINO-2-PYRAZINYL)FORMAMIDINE

To a stirred suspension of 3-amino-5-isopropylamino-6-chloropyrazinamide (7.2 g., 0.0315 mole) in dimethylformamide (70 ml.) is added in one portion phosphoryl chloride (7.0 ml.). The temperature rises to 65° C. and it is maintained at that temperature for 15 minutes by the application of heat. The reaction mixture then is poured into water (140 ml.) and the solution is neutralized with ammonium hydroxide, whereby the product separates yielding 4.5 g. (54%) of N,N-dimethyl-N'-(3-cyano-5-chloro-6-isopropylamino-2-pyrazinyl)formamidine, M.P. 144–145° C. After crystallization from isopropyl alcohol, the melting point remains at 144–145° C.

Analysis.—Calculated for $C_{11}H_{15}N_6Cl$: C, 49.55; H, 5.68. Found: C, 49.39; H, 5.60.

STEP C.—PREPARATION OF 3-AMINO-5-ISOPROPYLAMINO-6-CHLOROPYRAZINONITRILE

A solution of N,N-dimethyl-N'-(3-cyano-5-chloro-6-isopropylamino-2-pyrazinyl)formamidine (2.6 g., 0.01 mole) in 2% hydrochloric acid (50 ml.) is heated on the steam bath for 30 minutes during which time the product begins to precipitate. The reaction mixture is chilled and the product recovered by filtration to yield 1.26 g. (60%) of 3-amino-5-isopropylamino-6-chloropyrazinonitrile, M.P. 124–127° C. After crystallization from methylcyclohexane, the product melts at 126–128° C.

Analysis.—Calculated for $C_8H_{10}N_5Cl$: C, 45.45; H, 4.76; N, 33.12. Found: C, 44.81; H, 4.59; N, 33.35.

EXAMPLE 9

3-amino-5-dimethylamino-6-chloropyrazinonitrile

STEP A.—PREPARATION OF 3-AMINO-5-DIMETHYLAMINO-6-CHLOROPYRAZINAMIDE

To a stirred solution of 3-amino-5,6-dichloropyrazinamide (10.0 g., 0.05 mole) in dimethyl sulfoxide (150 ml.) is added dimethylamine (20 ml. of a 25% aqueous solution) and the reaction mixtuer is heated on the steam bath for 30 minutes. When the reaction mixture is poured into water (200 ml.) and chilled, the product separates yielding 9.0 g. (86%) of 3-amino-5-dimethylamino-6-chloropyrazinamide, M.P. 181–183° C. After recrystallization of the product from ethanol, melting point of the product remains unchanged.

*Analysis.*—Calculated for $C_7H_{10}N_5OCl$: C, 39.04; H, 4.68; N, 32.54. Found: C, 39.04; H, 4.55; N, 32.45.

STEP B.—PREPARATION OF 3-AMINO-5-DIMETHYL-AMINO-6-CHLOROPYRAZINONITRILE

To a solution of a 3-amino-5-dimethylamino-6-chloropyrazinamide (8.0 g., 0.037 mole) in dimethylformamide (80 ml.) is added phosphoryl chloride (8.0 ml.). The temperature of the reaction rises to 80° C. and is maintained at that temperature for 10 minutes by application of heat. The reaction mixture then is poured into water (200 ml.) and the resulting solution made slightly basic with ammonium hydroxide which causes the precipitation of a yellow solid. The solid is recovered by filtration, dissolved in 2% hydrochloric acid (100 ml.), and the solution is heated on the steam bath for 15 minutes. The product which separates is recovered from the chilled reaction mixtuer by filtration yielding 4.0 g. (55%) of 3-amino-5-dimethylamino-6-chloropyrazinonitrile, M.P. 120–122° C.

*Analysis.*—Calculated for $C_7H_8N_5Cl$: C, 42.55; H, 4.14; N, 35.45. Found: C, 42.68; H, 4.10; N, 35.62.

EXAMPLE 10

*3-amino-5-allylamino-6-chloropyrazinonitrile*

A solution of 3-amino-5,6-dichloropyrazinonitrile (10 g., 0.053 mole) in dimethyl sulfoxide (70 ml.) is heated to 60° C. and treated with allylamine (3.5 g., 0.061 mole). The mixture is stirred for 20 minutes without application of heat, then cooled and poured into cold water (200 ml.). The solid that separates is removed by filtration, washed with water and dried yielding 4.5 g. (56%) of 3-amino-5-allylamino-6-chloropyrazinonitrile which, after recrystallization from butyl chloride, melts at 103–105° C.

*Analysis.*—Calculated for $C_8H_8ClN_5$: C, 45.79; H, 3.85; N, 33.42. Found: C, 46.01; H, 3.89; N, 33.56.

EXAMPLE 11

*3-amino-5-ethylamino-6-chloropyrazinonitrile*

3-amino-5,6-dichloropyrazinonitrile from Example 3 (5.0 g., 0.0265 mole) is dissolved in dimethyl sulfoxide (50 ml.) at 65° C., then 70% aqueous ethylamine (3.5 ml., 0.05 mole) is added and the solution stirred at this temperature for 15 minutes. After cooling the reaction mixture is poured into water (150 ml.) and the solid that separates is removed by filtration, washed with water and dried yielding 3.2 g. (62%) of product, M.P. 100–105° C. After recrystallization from isopropyl alcohol, the 3-amino-5-ethylamino-6-chloropyrazinonitrile melts at 107–109° C.

*Analysis.*—Calculated for $C_7H_8ClN_5$: C, 42.55; H, 4.14; N, 35.45. Found: C, 42.21; H, 3.92; N, 35.34.

EXAMPLE 12

*3-amino-5-diethylamino-6-chloropyrazinonitrile*

To a suspension of 3-amino-5,6-dichloropyrazinonitrile (8.0 g., 0.042 mole) in boiling ethanol (80 ml.) is added diethylamine (6.2 g., 0.085 mole). After refluxing for 18 hours the reaction mixture is cooled and poured into water (160 ml.). The solid that separates is removed by filtration, washed with water and dried yielding, 6.6 g. (70%) of 3 - amino-5-diethylamino-6-chloropyrazinonitrile, M.P. 114–115° C. After recrystallization from methylcyclohexane, the melting point is 114–116° C.

*Analysis.*—Calculated for $C_9H_{12}ClN_5$: C, 47.50; H, 5.36; N, 31.05. Found: C, 47.98; H, 5.36; N, 31.24.

EXAMPLE 13

*3-amino-5-methoxy-6-chloropyrazinonitrile*

STEP A.—PREPARATION OF 3-AMINO-5-METHOXY-6-CHLOROPYRAZINAMIDE

Sodium (2.3 g., 0.1 mole) is dissolved in methanol (100 ml.) and the solution evaporated to dryness at reduced pressure. The solid sodium methoxide is dissolved in dimethylformamide and 3-amino-5,6-dichloropyrazinamide (20.7 g., 0.1 mole) (from Example 3, Step A) added and the mixture stirred and heated on a steam bath for 30 minutes. The solvent is removed by distillation at reduced pressure and the residue suspended in water, filtered, washed with water and recrystallized from isopropyl alcohol.

STEP B.—PREPARATION OF N,N-DIMETHYL-N′-(3-CYANO - 5 - CHLORO - 6 - METHOXY - 2 - PYRAZINYL) FORMAMIDINE

This compound is prepared as described in Example 3, Step B, except that an equivalent quantity of 3-amino-5 - methoxy-6-chloropyrazinamide is substituted for 3-amino-5,6-dichloropyrazinamide.

STEP C.—PREPARATION OF 3-AMINO-5-METHOXY-6-CHLOROPYRAZINONITRILE

This compound is prepared as described in Example 3, Step C, except that an equivalent quantity of N,N-dimethyl - N′ - (3-cyano-5-chloro-6-methoxy-2-pyrazinyl)-formamidine is substituted for N,N-dimethyl-N′-(3-cyano-5,6-dichloro-2-pyrazinyl)formamidine.

EXAMPLE 14

*3-amino-5-methylthio-6-chloropyrazinonitrile*

This compound is prepared as described in Example 13, Steps A through C, except that an equivalent quantity of the sodium salt of methyl mercaptan is substituted for sodium methoxide in Step A. Thus, the product of each step in order is 3-amino-5-methylthio-6-chloropyrazinamide, N,N-dimethyl-N′-(3-cyano-5-chloro-6-methylthio-2-pyrazinyl)formamidine and 3 - amino-5-methylthio-6-chloropyrazinonitrile.

EXAMPLE 15

*3-amino-5-ethylthio-6-bromopyrazinonitrile*

This compound is prepared as described in Example 13, Steps A through C, except that an equivalent quantity of the sodium salt of ethyl mercaptan is substituted for the sodium methoxide and an equivalent quantity of 3-amino-5-chloro-6-bromopyrazinamide (from Example 5, Step C, part 1) is substituted for 3-amino-5,6-dichloropyrazinamide in Step A. Thus, the product of each step in order is 3-amino-5-ethylthio-6-bromopyrazinamide, N, N - dimethyl - N′ - (3 - cyano-5-bromo-6-ethylthio-2-pyrazinyl)formamidine, and 3 - amino - 5 - ethylthio-6-bromopyrazinonitrile.

EXAMPLE 16

*3,5-diamino-6-bromopyrazinonitrile*

This product is prepared following the procedure described in Example 7, Steps A and B, except that in Step A methyl 3-amino-5-chloro-6-bromopyrazinoate (from Example 5, Step B) is substituted for methyl 3-amino-5,6-dichloropyrazinoate, and the 3,5-diamino-6-bromopyrazinamide thus prepared is substituted for the 3,5-diamino-6-chloropyrazinamide used in Step B.

EXAMPLE 17

*3-amino-5-(2-hydroxyethylamino)-6-chloropyrazinonitrile*

By replacing the allylamine used in Example 10 with an equivalent amount of 2-hydroxyethylamine and stirring the reaction mixture for 24 hours instead of 20 minutes and otherwise conducting the reaction as in Example 10 there is obtained 3-amino-5-(2-hydroxyethylamino)-6-chloropyrazinonitrile.

EXAMPLE 18

*3-amino-5-furfurylamino-6-chloropyrazinonitrile*

By replacing the allylamine used in Example 10 with an equivalent amount of furfurylamine and conducting the reaction as described in Example 10 there is obtained 3-amino-5-furfurylamino-6-chloropyrazinonitrile.

EXAMPLE 19

*3-amino-5-anilino-6-chloropyrazinonitrile*

A solution of 3-amino-5,6-dichloropyrazinonitrile (10 g., 0.053 mole), aniline (14.9 g., 0.16 mole) and aniline hydrochloride (13.7 g., 0.116 mole) and dimethyl sulfoxide (100 ml.) is heated at 65° C. for 3 hours and then cooled and diluted with water (100 ml.). The solid that separates is removed by filtration, washed with water, dried and washed with methylcyclohexane. After recrystallization from isopropyl alcohol there is obtained 3-amino-5-anilino-6-chloropyrazinonitrile.

EXAMPLE 20

*3-amino-5-phenyl-6-bromopyrazinonitrile*

This product is prepared following the procedure of Example 1, Steps A through C, except methyl 3-amino-6-chloropyrazinoate employed in Step A of Example 1 is replaced by an equimolecular quantity of methyl 3-amino-5-phenyl-6-bromopyrazinoate. By following the procedures of Steps A through C of Example 1, there is produced successively 3-amino-5-phenyl-6-bromopyrazinamide, N,N-dimethyl - N' - (3 - cyano-5-bromo-6-phenyl-2-pyrazinyl)-formamidine and 3-amino-5-phenyl-6-bromopyrazinonitrile.

EXAMPLES 21–23

Similarly, by replacing methyl 3-amino-6-chloropyrazinoate in Example 1, Step A, by an equivalent quantity of:

methyl 3-amino-5-p-tolyl-6-chloropyrazinoate (Ex. 21),
methyl 3 - amino-5-p-chlorophenyl-6-chloropyrazinoate (Ex. 22), and
methyl 3-amino-5-methyl-6-bromopyrazinoate (Ex. 23), and following substantially the same procedure described in Steps A through C of Example 1 there is produced:

Ex. 21, 3-amino-5-p-tolyl-6-chloropyrazinonitrile,
Ex. 22, 3-amino-5-p-chlorophenyl-6-chloropyrazinonitrile, and
Ex. 23, 3-amino-5-methyl-6-bromopyrazinonitrile.

EXAMPLE 24

*3-amino-5-benzyloxy-6-chloropyrazinonitrile*

This product is prepared by the process described in Example 13, Steps A through C, except the methanol used in Step A is replaced by benzyl alcohol.

EXAMPLE 25

*3-amino-5-benzylthio-6-chloropyrazinonitrile*

This product is prepared by the process described in Example 13, Steps A through C, except that the sodium methoxide used in Step A is replaced by the sodium salt of benzyl mercaptan.

EXAMPLE 26

*3-amino-5-p-methylanilino-6-chloropyrazinonitrile*

This product is prepared by the process described in Example 19 except the aniline and the aniline hydrochloride employed there are replaced by equimolecular quantities of p-toluidine and p-toluidine hydrochloride respectively.

EXAMPLE 27

*3-amino-5-p-chloroanilino-6-chloropyrazinonitrile*

This product is prepared by the process described in Example 19 except the aniline and the aniline hydrochloride employed there are replaced by equimolecular quantities of p-chloroaniline and p-chloroaniline hydrochloride respectively.

Other 3-amino-5-X-6-chloropyrazinonitrile compounds that are prepared by the procedures described in Example 8, Steps A through C, are identified in the following table. In each example the pyrazinamide of the formula

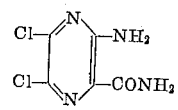

is treated with an amine of the formula $R^1R^2NH$ according to the process described in Step A of Example 8 to give the 3-amino-5-$R^1R^2$N-6-chloropyrazinamide which then is converted to N,N-dimethyl-N'-(3-cyano-5-chloro-6-$R^1R^2$N-2-pyrazinyl)formamidine by the process described in Step B of Example 8. This product then is hydrolyzed to the desired 3-amino-5-$R^1R^2$N-6-chloropyrazinonitrile by the method described in Step C of Example 8. The variable group $R^1R^2$N of the amine reactant and in the subsequent products formed remain unchanged by the reaction and are identified in the appropriate columns of the table. The following table identifies other 3-amino-5-$R^1R^2$N-6-chloropyrazinonitriles that are representative of the products that are prepared by substituting equivalent quantities of known amines of the formula $R^1R^2NH$ for the isopropylamine used in Example 8.

TABLE

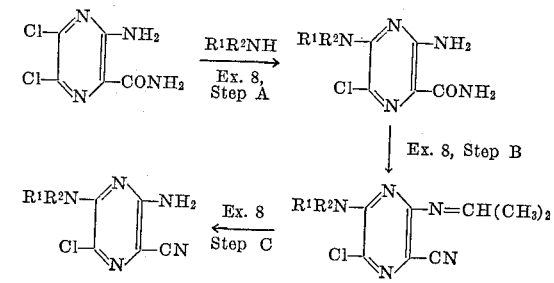

| Ex. No. | R¹ | R² |
|---|---|---|
| 28 | Benzyl | H |
| 29 | p-Methylbenzyl | H |
| 30 | p-Chlorobenzyl | H |
| 31 | 2,2,2-trifluoroethyl | H |
| 32 | Cyclopropylmethyl | H |
| 33 | Cyclopentyl | H |
| 34 | 4-pyridylmethyl | H |
| 35 | 2-dimethylaminoethyl | H |
| 36 | Methyl | Allyl |
| 37 | Propyl | Butyl |
| 38 | Tetramethylene | |
| 39 | Hexamethylene | |

While the invention has been described by certain specific reactants and certain specific reaction conditions to produce specific novel products, it is to be understood that the invention is not limited by the examples but embraces the variations hereinbefore described and hereinafter claimed.

What is claimed is:

1. A process for preparing 3-amino-5-X-6-halopyrazinonitriles comprising the reaction of a 3-amino-5-X-6-halopyrazinamide with dimethylformamide and an agent selected from phosphoryl chloride and thionyl chloride to give N,N-dimethyl-N'-(3-cyano - 5-halo-6-X-2-pyrazinyl) formamidine which is hydrolyzed with a strong acid to 3-amino-5-X-6-halopyrazinonitrile, wherein in each of the foregoing products X is selected from hydrogen, chloro, bromo, lower alkyl, lower alkoxy, lower alkylthio, phenyl, halophenyl, lower alkyl phenyl, phenyl-lower alkoxy, phenyl-lower alkylthio and —NR¹R², wherein each of the variable radicals R¹ and R² is separately selected from hydrogen, phenyl, halophenyl, and lower alkyl phenyl, lower alkyl, lower alkenyl, halo-lower alkyl, hydroxy-lower alkyl, lower(alkoxyalkyl), lower(cycloalkylalkyl) wherein the cycloalkyl moiety has 3 to 6 nuclear carbons, lower-(dialkylaminoalkyl), phenyl-lower alkyl, lower-(alkylphenylalkyl), halophenyl-lower alkyl, pyridyl-lower alkyl, furyl-lower alkyl, lower cycloalkyl having from 3 to 6 nuclear carbon atoms, lower alkoxy, and wherein R¹ and R² are joined together to form with the nitrogen to which they are attached a radical of the structure

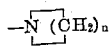

wherein $n$ is an integer from 4 to 6, and wherein the 6-position halo is selected from chloro and bromo.

2. A process for preparing 3-amino-6-halopyrazinonitrile wherein halo is selected from chloro and bromo which comprises heating a solution of 3-aminopyrazinonitrile and chlorine or bromine.

3. A process as claimed in claim 1 wherein 3-amino-5,6-dichloropyrazinamide is used as starting material to form 3-amino-5,6-dichloropyrazinonitrile.

4. A process involving the reaction in the presence of a polar solvent of 3-amino-5,6-dichloropyrazinonitrile with a compound of the formula R¹R²NH to give 3-amino-5-R¹R²N-6-chloropyrazinonitrile wherein each of the variables R¹ and R² is separately selected from hydrogen, phenyl, halophenyl, lower alkylphenyl, lower alkyl, lower alkenyl, halo-lower alkyl, hydroxy-lower alkyl, lower (alkoxyalkyl), lower(cycloalkylalkyl) wherein the cycloalkyl moiety has 3 to 6 nuclear carbons, lower-(dialkylaminoalkyl), phenyl-lower alkyl, lower-(alkylphenylalkyl), halophenyl-lower alkyl, pyridyl-lower alkyl, furyl-lower alkyl, lower cycloalkyl having from from 3 to 6 carbon atoms, lower alkoxy, and wherein R¹ and R² are joined together to form with the nitrogen to which they are attached a radical of the structure

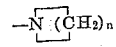

wherein $n$ is an integer from 4 to 6.

5. A process involving heating under pressure a mixture of 3-amino-5,6-dichloropyrazinonitrile and ammonia to give 3,5-diamino-6-chloropyrazinonitrile.

6. 3-amino-5-X-6-halopyrazinonitrile wherein X is selected from hydrogen, chloro, bromo, lower alkyl, lower alkoxy, lower alkylthio, phenyl, halophenyl, lower alkylphenyl, phenyl-lower alkoxy, phenyl-lower alkylthio and —NR¹R², wherein each of the variable radicals R¹ and R² is separately selected from hydrogen, phenyl, halophenyl, lower alkylphenyl, lower alkyl, lower alkenyl, halo-lower alkyl, hydroxy-lower alkyl, lower (alkoxyalkyl), lower (cycloalkylalkyl) wherein the cycloalkyl moiety has 3 to 6 nuclear carbons, lower-(dialkylaminoalkyl), phenyl-lower alkyl, lower-(alkylphenylalkyl), halophenyl-lower alkyl, pyridyl-lower alkyl, furyl-lower alkyl, lower cycloalkyl having from 3 to 6 nuclear carbon atoms, lower alkoxy, and wherein R¹ and R² are joined together to form with the nitrogen to which they are attached a radical of the structure

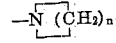

wherein $n$ is an integer from 4 to 6, and wherein the 6-position halo is selected from chloro and bromo.

7. 3,5-diamino-6-chloropyrazinonitrile.
8. 3-amino-5-(di-lower alkyl)amino-6-chloro-pyrazinonitrile.
9. 3-amino-6-chloropyrazinonitrile.
10. 3-amino-6-bromopyrazinonitrile.
11. 3-amino-5,6-dichloropyrazinonitrile.
12. 3-amino-5-chloro-6-bromopyrazinonitrile.

References Cited

Wertheim: Textbook of Organic Chemistry, pp. 763–764, second edition (1945).

NICHOLAS S. RIZZO, *Primary Examiner.*